Figure 1:
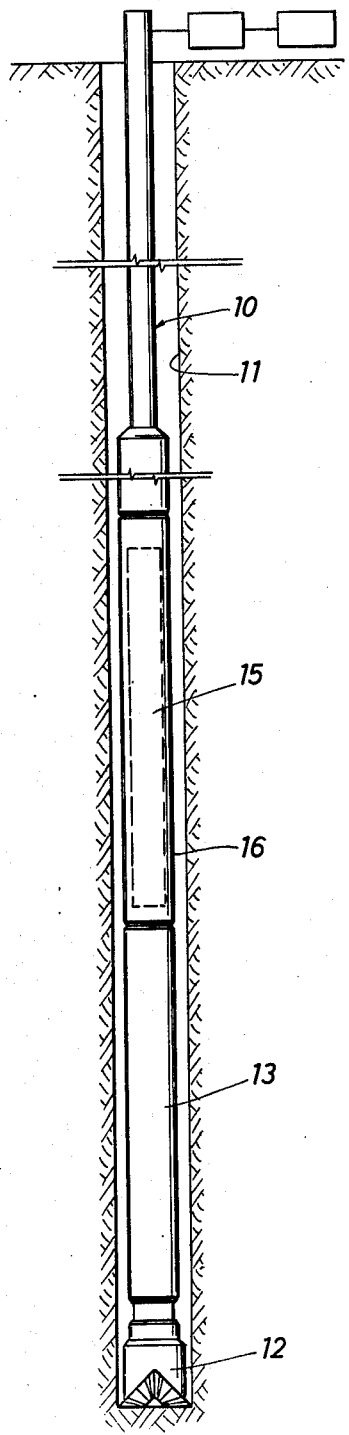

United States Patent [19]

Tanguy et al.

[11] 4,120,198
[45] Oct. 17, 1978

[54] WEIGHT-ON-BIT MEASURING APPARATUS

[75] Inventors: Denis R. Tanguy, Houston; Larry J. Leising, Sugar Land, both of Tex.

[73] Assignee: Schlumberger Technology Corporation, New York, N.Y.

[21] Appl. No.: 791,101

[22] Filed: Apr. 26, 1977

[51] Int. Cl.² ............................................. E21B 47/00
[52] U.S. Cl. ..................................................... 73/151
[58] Field of Search ................... 73/151, 151.5, 152; 340/18 LD; 175/39, 40

[56] References Cited

U.S. PATENT DOCUMENTS

| | | | |
|---|---|---|---|
| 2,764,310 | 9/1956 | Bendar | 73/151 X |
| 3,466,597 | 9/1969 | Richter, Jr. et al. | 340/18 LD UX |
| 3,864,968 | 2/1975 | Anderson | 73/151 |

Primary Examiner—Jerry W. Myracle
Attorney, Agent, or Firm—David L. Moseley; William R. Sherman; Edward M. Roney

[57] ABSTRACT

In accordance with an illustrative embodiment of the present invention, apparatus for use in measuring weight-on-bit downhole during a drilling operation includes tubular telescoping members having resilient means reacting therebetween whereby relative longitudinal movement of the members is functionally relative to axial loading of a drill bit, sensor means mounted on one member and connected by linkage means to the other member for sensing the amount of relative movement, and means providing an elastic discontinuity in said linkage means for substantially isolating said sensor means from vibratory movement of said other member due to the cutting action of the bit.

11 Claims, 4 Drawing Figures

U.S. Patent    Oct. 17, 1978    Sheet 1 of 2    4,120,198

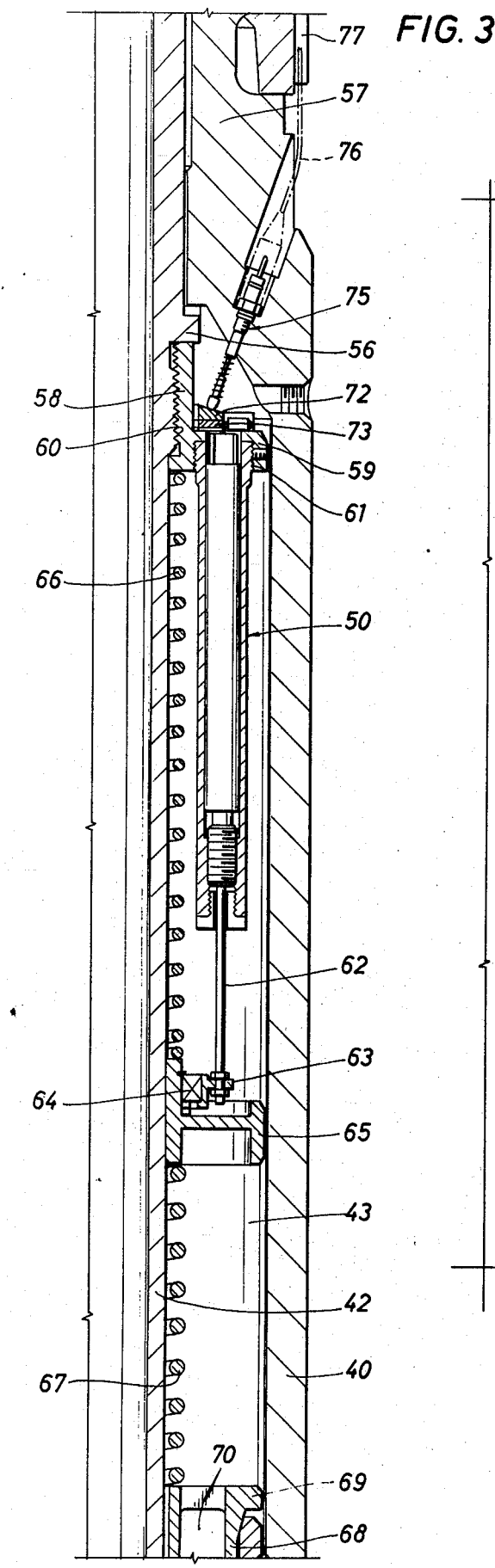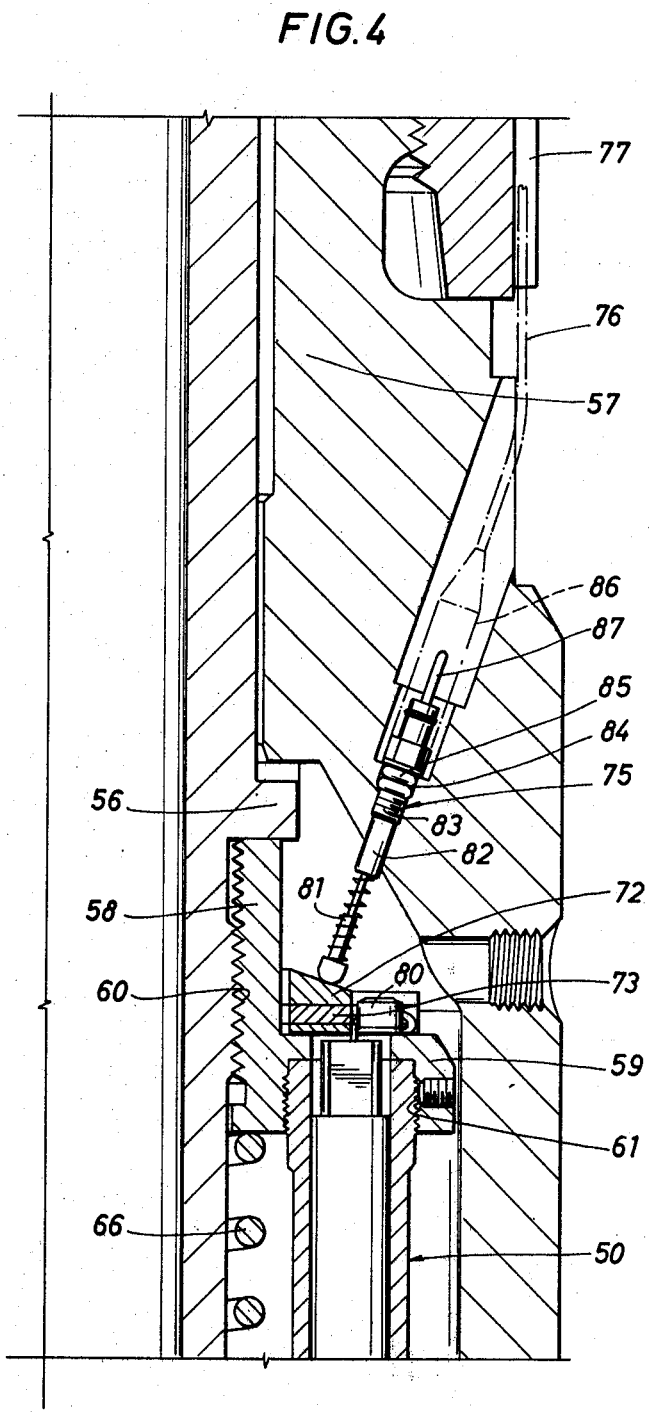

WEIGHT-ON-BIT MEASURING APPARATUS

This invention relates generally to the making of measurements during the drilling of a borehole, and particularly to a new and improved apparatus located adjacent the drill bit and arranged to provide measurements of the amount of weight applied to the bit downhole during the drilling operation.

Weight-on-bit (hereinafter WOB) is generally considered to be one of the most (if not the most) important single mechanical factors in making hole. The weight is applied by a length of heavy drill collars attached immediately above the bit and suspended in the borehole on smaller diameter drill pipe. In conventional drilling practice, the entire length of the drill pipe and an upper portion of the drill collar string are suspended from the derrick in tension, so that the amount of WOB can be varied by changing the indicated surface hookload. A proper amount of WOB is necessary to optimize the rate that the bit penetrates a particular type of earth formation, as well as to optimize the rate of bit wear. To some extent hole direction can be controlled by varying the WOB. In addition, accurate measurement of WOB is necessary for safety purposes in analyzing drilling rate "breaks" indicative of entry of the bit into more porous earth formations.

In the past, WOB has been measured at the surface by comparing indicated hook-load weight to off-bottom weight of the drill string. However, a surface measurement is not always reliable due to drag of the drill string on the borehole wall in deviated wells, and other factors. Consequently, there is a pressing need to know the actual weight on the bit rather than the weight on the hook. Recent developments of borehole telemetry systems have made it possible to make the measurement downhole, but for the most part the downhole sensors that have been proposed have taken the form of strain gauge devices to measure compressive stresses in the walls of a pipe sub. However, pipe wall stresses due to well pressures have had a deleterious effect on the accuracy of this type of transducer.

It is generally considered to be good drilling practice to run a shock absorbing device immediately above the bit to protect the drill collars and pipe from early fatigue failure due to vibration. Such devices also tend to optimize drill bit life and rate of penetration by attenuating shock loading, and are desirable also to help protect delicate components of a telemetry system such as that mentioned above. Although shock absorbing devices have taken a variety of forms, almost all that applicants are aware of include a resilient means in the form of a spring, rubber element, compressed gas or the like capable of longitudinal deflection under drilling load. It will be recognized that the amount of deflection is functionally related to the magnitude of the WOB, and the present invention takes advantage of this characteristic of a drilling shock absorber in providing a sensor capable of detecting downhole the WOB being applied during the drilling operation.

The general object of the present invention is to provide a new and improved sensor apparatus for measuring weight-on-bit downhole with high accuracy.

Another object of the present invention is to provide a new and improved sensor apparatus in combination with a drill string shock absorber for enabling measurement downhole of the weight applied to the bit during the drilling operation.

These and other objects are attained in accordance with the concepts of the present invention through the provision of a WOB measuring apparatus that comprises tubular housing members adapted to be connected in a drill string and arranged for limited longitudinal relative movement, means for connecting one of said members to a drill bit, and means yieldably resisting relative movement of said members in a manner such that the extent of such relative movement is a function of the compressive loading of said members. A sensor is fixed to the other of said members, and linkage means is provided for transmitting the relative motion of said one member to said sensor. In a preferred embodiment, said linkage means includes isolation means providing an elastic discontinuity therein so that substantially only the average relative movement of said one member is transmitted to said sensor. Under dynamic drilling conditions, the output of the sensor is a measure of the average WOB, and the sensor itself will have prolonged life due to the fact that it is isolated from vibration caused by the rotary cutting action of the bit.

Figure 2:
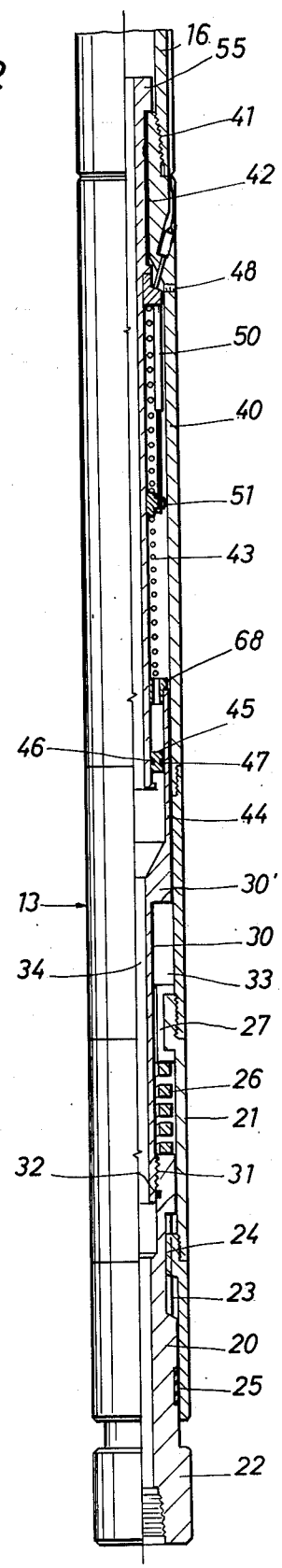

The present invention has other objects and advantages which will become more clearly apparent in connection with the following detailed description of a preferred embodiment, taken in conjunction with the appended drawings in which:

FIG. 1 is a schematic illustration of a borehole having a drill string suspended therein which incorporates a WOB sensor in accordance with the present invention;

FIG. 2 also is a somewhat schematic view of the WOB sensor of FIG. 1.

FIG. 3 is an enlarged detailed view of the upper portion of the apparatus of FIG. 2; and FIG. 4 is a further enlarged fragmentary cross-sectional view of the connector apparatus employed in the present invention.

Referring initially to FIG. 1, there is shown a drill string 10 suspended in a borehole 11 and having a typical drill bit 12 attached to its lower end. Immediately above the bit 12 is a WOB sensor 13 constructed in accordance with the present invention. The output of the sensor 13 is fed to an appropriate transmitter assembly 15, for example, of the type shown and described in U.S. Pat. No. 3,309,656, Godbey, which is incorporated herein by reference. The transmitter 15 is located and attached within a special drill collar section 16 and functions to impart to the drilling fluid being circulated downwardly within the drill string 10 an acoustic signal which is modulated according to the sensed WOB data. The acoustic signal is detected at the surface and processed to provide recordable data representative of the downhole measurement. Although an acoustic data transmission system is mentioned herein, other types of telemetry systems of course may be used, provided they are capable of transmitting an intelligible signal from downhole to the surface during the drilling operation.

As shown in FIG. 2, the sensor 13 includes a spline mandrel 20 that is telescopically received within a housing 21 with the mandrel 20 being secured to the bit 12 by a threaded box 22. Coengaged splines 23 and 24 on the mandrel and housing, respectively, corotatively couple the members together, and a seal assembly 25 prevents fluid leakage. An elongated coil spring 26 having its upper end 27 attached by suitable means to the housing 21 and its lower end 28 reacting against the mandrel 20 provides yieldable resistance to longitudinal relative movement whereby the extent of deflection of the spring with corresponding longitudinal movement of the mandrel relative to the housing is a function of the axial force applied to the bit 12. In a preferred embodiment, an internally arranged flow tube 30 has its lower end fixed by threads 31 to the mandrel 20 so as to be movable therewith, and extends upwardly to enclose an oil-fitted chamber 33 which contains the spring 26. An intermediate section 30' of the flow tube 30 is enlarged in diameter and is slidably arranged with respect to the housing 21 by a bushing or the like (not shown), and a sleeve 44 extends upwardly from the section 30'. By virtue of the fact that the flow tube 30 is threaded into the mandrel 20, the flow tube 30 and the mandrel 20 move jointly within the housing 21 during telescoping action, whereby the extent of relative longitudinal movement between the housing 21 and the flow tube 30 is a function of the axial loading of the bit 12 as previously described.

An upper section 40 of the housing 21 is threaded at its upper end for connection to a drill collar 16 thereabove. A mandrel 42 is fixed to the housing section and extends downwardly therein in laterally spaced relation to provide an elongated annular cavity 43. An annular floating piston 45 having inner and outer seals 46 and 47 is sealingly slidable against both the mandrel 42 and the sleeve 44 to enable the cavities 43 and 33 to be filled with lubricating oil through a suitable fill plug 48. The piston 45 transmits inside pressure to the oil in the cavity 43, and to the cavity 33 via the annular clearance space between the sleeve 44 and the inner wall of the housing 21, and such pressure acts downwardly on the mandrel 20 to enable use of a spring 26 having a relatively low spring rate to provide improved shock absorbing action, as disclosed and covered in U.S. Pat. No. 3,963,228, Karle, and incorporated herein by reference. The cavity 43 is sized and arranged to contain a relative movement sensor 50 and a linkage assembly 51 as now will be described.

Referring now to FIGS. 3 and 4, the mandrel 42 is fixed to the housing section 40 by a nut (not shown) which is threaded to the top of the mandrel and tightened with respect to an outwardly directed shoulder 56 that engages below an inwardly thickened portion 57 of the housing section. A collar 58 having an outwardly extending flange 59 is threaded to the mandrel 42 at 60, with the flange being counterbored at 61 to receive the threaded upper end of a potentiometer assembly 50. The particular details of the assembly 50 form no part of the present invention with the assembly being a commercially available device. The rod 62 of the potentiometer assembly 50 has its lower end attached to a ring 63 which encompasses a roller bearing 64 fixed by snap rings or the like against longitudinal movement relative to a piston 65. The piston 65 is mounted between upper and lower coil springs 66 and 67 having significantly different spring rates, with the upper end of the upper coil spring 66 bearing against the collar 58 and the lower end of the lower coil spring 67 bearing against a follower ring 68 having an external tapered flange 69 which engages the upper end of the sleeve 44. The ring 68 is provided with passages 70 for the free flow of lubricating oil.

The potentiometer assembly 50 is electrically connected as a rheostat for two wire output, with one wire being grounded to the collar assembly 58 by a set screw 80, and the other wire being connected to a conductive ring 72 of brass or the like by attachment to another set screw (not shown) fixed thereto. The conductive ring 72 is electrically isolated by a non-conductive washer 73, and both the ring 72 and the washer 73 are secured to the flange 59 by screws or the like fitted through plastic bushings. A connector assembly shown generally at 75 provides for electrical feed-through to a single external wire 76 which may extend along a groove 77 cut in the outside surface on the drill collar 16 to a suitable pin connector (not shown) adapted to provide electrical coupling to the transmitter assembly 15. The connector assembly 75, as shown in detail in FIG. 4, utilizes a spring loaded, telescoping contact 81 which bears against the conductive ring 72. The contact body 82 has external threads 83 which mate with threads in a bore 84 through the housing section 40, and carries O-rings 85 to prevent drilling mud from the well annulus from getting into the cavity 43. On the outside, a suitable female boot-type plug 86, shown in phantom lines, mates with the pin 87 of the connector 75 to provide for electrical connection with the external wire 76. Although other connector assemblies may be used, the construction shown in FIG. 4 is preferred because it can be screwed into the housing and make contact with the conductive ring 72 without having to twist a conductor as would be the case of a hard wired and soldered arrangement.

In operation, the WOB sensing apparatus as previously described and shown in the drawings is connected in the drill string 10 immediately above the bit 12 and immediately below the special drill collar 16 which houses the transmitter 15. With the bit 12 rotating on bottom and the circulation of drilling fluids initiated in a typical manner, the longitudinal deflection of the spring 26 is a function of the amount of weight actually being applied to the bit. Such deflection enables upward movement of the mandrel 20 within the housing 21, which causes corresponding relative upward movement of the flow tube 30, and the follower ring 68. A predetermined portion of such motion is transmitted by the spring 67 to the piston 65 and thus to the rod 62 of the potentiometer assembly 50 and causes the rod to telescope upwardly within the assembly whereby with constant current the voltage across the sensor is proportional to the weight being applied to the bit 12.

The previously described combination of a follower 68, upper and lower springs 66 and 67 having significantly different stiffnesses, and a piston 65, advantageously provides an elastic discontinuity in the linkage which functions in the nature of a mechanical low pass filter. Identifying the axial displacement of the follower 68 as X, the axial displacement of the piston 65 as Y, and the respective stiffnesses of the upper and lower springs as $K_u$ and $K_l$, (and assuming a relatively light-weight piston), the transmissibility of follower motion X to piston motion Y may be expressed as $$\left| \frac{Y}{X} \right| = \frac{1}{\sqrt{\left(1 + \frac{K_u}{K_l}\right)^2 + \left(\frac{2\pi f c}{K_l}\right)^2}}$$

where $c$ is the effective damping of the piston 65 due to restricted oil flow past its outer periphery, and $f$ is the frequency of the follower motion X.

The DC response of the system gives a value for Y that is approximately 80% of the input motion X. As an input frequency is increased, it can be demonstrated that for excitation resulting from tri-cone drill bit vertical vibration at rotary speeds of from 60–240 rpm the response decreases, being between 12% and 3% of the input motion of the rotary speeds noted, and with relatively large damping c of the piston 65. The time constant of the system is approximately ½ second which allows reasonably quick response to slow changes in static value of WOB.

The provision of the roller bearing 64 between the drive ring 63 to which the rod 62 is attached, and the piston 65, effectively isolates the potentiometer assembly 50 from torsional vibrations generated during the rotary cutting action of the bit 12.

It now will be recognized that a new and improved WOB sensor has been disclosed having capability for making measurements downhole with high accuracy. Such measurement is made in a simple and reliable manner by measuring the deflection of a drilling shock absorber spring, which is a device that is itself highly useful in protecting downhole instrumentation and the drill string from damage due to vibration. High frequency spring deflections due to tri-cone bit action are isolated from the measuring sensor or transducer by means of a mechanical low pass filter. The connector and contact assembly used with the sensor facilitates easy assembly and disassembly.

Since certain changes or modifications may be made in the disclosed embodiment without departing from the inventive concepts involved, it is the aim of the appended claims to cover all such changes and modifications falling within the true spirit and scope of the present invention.

We claim:

1. A weight-on-bit measuring apparatus comprising: tubular housing members adapted to be connected in a drill string and arranged for limited longitudinal relative movement; means for connecting one of said members to a drill bit; means yieldably resisting longitudinal relative movement of said members in a manner such that the extent of said relative movement is a function of the axial loading of said members; and means for measuring the longitudinal relative movement of said members including a sensor on the other of said members, linkage means coupled between said one member and said sensor, and means providing an elastic discontinuity in said linkage means for substantially isolating said sensor from vibration of said one member due to the cutting action of a drill bit.

2. The apparatus of claim 1 wherein said isolating means comprises a plurality of springs coupled in series with one of said springs having a different spring rate than another of said springs to provide a low transmissibility factor.

3. The apparatus of claim 1 wherein said linkage means includes bearing means for transmitting longitudinal motion while blocking transmission of torsional vibration to said sensor.

4. The apparatus of claim 1 wherein said sensor includes means providing an electrical resistance that is varied as a function of said longitudinal relative movement, and circuit means for feeding an electrical signal controlled by variation of said resistance to the exterior of said other member.

5. The apparatus of claim 1 further including means for transmitting to the surface during drilling a signal having a predetermined relation to the subject of said sensor.

6. A weight-on-bit measuring apparatus comprising: tubular housing members adapted to be connected in a drill string and arranged for limited longitudinal relative movement; means for connecting one of said members to a drill bit; resilient means yieldably resisting longitudinal relative movement of said members in a manner such that the extent of said relative movement is a function of the axial loading of said members; and means for measuring the longitudinal relative movement of said members including a transducer fixed to the other of said members, and linkage means for coupling the motion of said one member to said transducer, said linkage means including a piston, a first spring having a first stiffness value reacting between said one member and said piston, and a second spring having a second stiffness value reacting between said piston and said other member, said first and second stiffness values being substantially different.

7. The apparatus of claim 6 wherein said linkage means further includes bearing means connecting said transducer to said piston, said bearing means transmitting longitudinal motion while blocking transmission of torsional vibration to said transducer.

8. The apparatus of claim 7 wherein said transducer includes an electrical resistance that is variable as a function of said longitudinal relative movement, and circuit means for feeding a voltage signal of a level controlled by variation of said resistance to the exterior of said other member.

9. The apparatus of claim 8 wherein said circuit means includes a conductive ring, and connector means extending through the wall of said other member and comprising a spring loaded contact engaging said ring.

10. The apparatus of claim 6 further including means for transmitting to the surface during drilling a signal having a predetermined relation to the output of said transducer.

11. A weight-on-bit measuring apparatus comprising: shock absorbing means adapted to be connected to a drill bit and including resilient means capable of deflection due to weight applied to a drill bit; means for measuring the amount of said deflection and for providing an output indicative thereof; and means for transmitting to the surface of a borehole during drilling a signal having a predetermined relation to said output.

* * * * *